Nov. 24, 1925.
D. A. LEIGH
1,562,566
PACKING CONSTRUCTION
Filed March 12, 1924
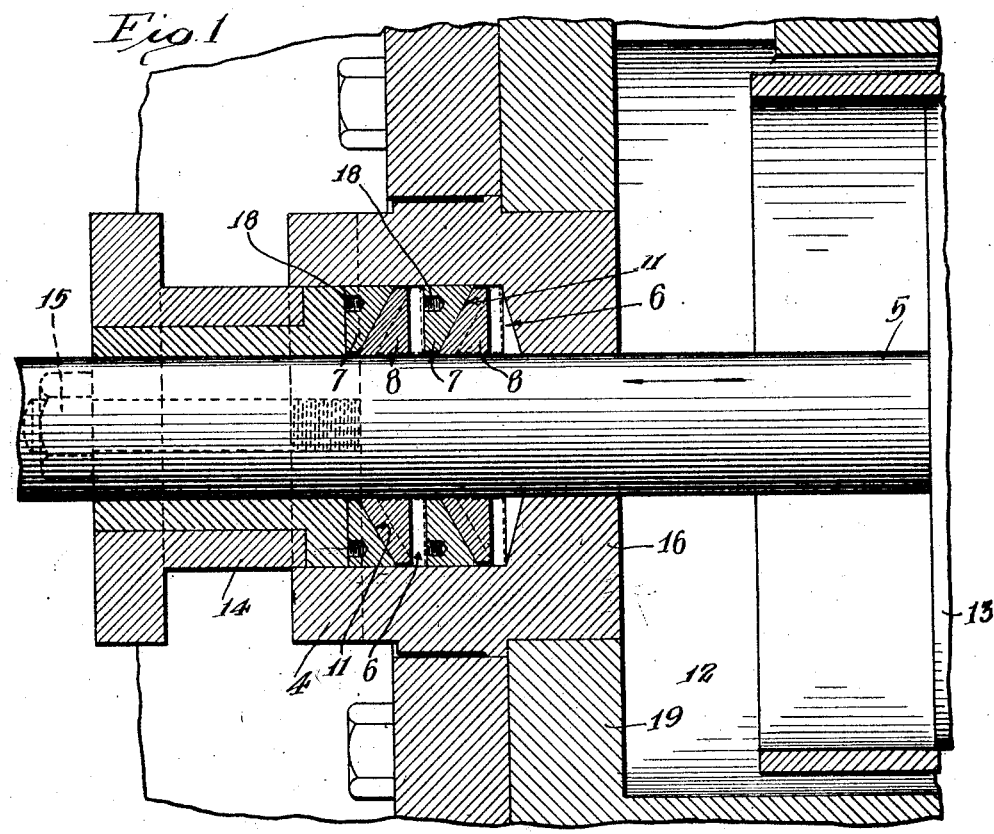
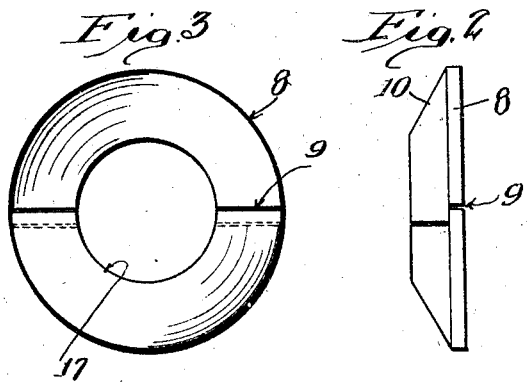
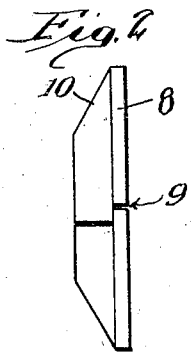
Inventor
Don A. Leigh
By Lyon & Lyon
Attorneys Patented Nov. 24, 1925.

1,562,566

UNITED STATES PATENT OFFICE.

DON A. LEIGH, OF FELLOWS, CALIFORNIA.

PACKING CONSTRUCTION.

Application filed March 12, 1924. Serial No. 698,768.

*To all whom it may concern:*

Be it known that I, DON A. LEIGH, a citizen of the United States, residing at Fellows, in the county of Kern and State of California, have invented a new and useful Packing Construction, of which the following is a specification.

This invention relates to packing of the type employed, for example, in packing plungers, plunger rods and pistons. The packer will be described as used in a pump, but it is to be understood that it can be used elsewhere, even though modifications of the construction are necessary.

An object of the invention is to provide a packing that will fit closer to the member that is to be packed when the member moves in one direction than when it moves in the opposite direction. For example, when a pump is in operation the plunger rod should be closely packed at the time that the pressure in the cylinder is greater than atmospheric, thus to prevent leakage of fluid between the packing and plunger rod. This invention, besides achieving this result, also permits the packing to be free from the plunger rod upon the idling stroke of the plunger, or, in other words, upon the suction stroke of the plunger. Thus, less wear is produced on the plunger rod and whatever wear there is will be much more uniformly distributed than is the case where the packing closely fits the plunger rod on the suction stroke of the pump.

The beneficial results of the invention are effected by the use of a split or sectional ring or rings, which of themselves are not new, but such sectional rings are mounted in recesses of sufficient length to permit of reciprocation of the ring or rings with reference to the walls of said recesses. The rings have bevelled faces which engage like bevelled faces of end walls of the recesses, thus to cause the rings to tighten upon the member that is being packed when some of the fluid compressed within the cylinder leaks into the recesses and exerts pressure against the packing rings.

The accompanying drawings illustrate the invention:

Fig. 1 is a sectional elevation of a construction embodying the invention, a fragment of a plunger also being shown.

Fig. 2 is an edge view of one of the packing rings.

Fig. 3 is an elevation of Fig. 2 from the right thereof.

Referring to the drawings, there are provided two members mounted for relative movement therebetween, said members being in this particular instance a stuffing box 4 and a plunger rod 5 adapted to be reciprocated in the stuffing box by any suitable means. The member 4 has in it an annular recess or recesses 6. Two are shown, in this instance, one end wall of each recess being formed by an abutment ring 7, and one of said abutment rings and the inner end wall 16 of the stuffing box forming the other end walls of the respective recesses.

In the recesses 6 are packing rings 8 which are split, as indicated at 9 in Figs. 2 and 3, thus producing a sectional construction of said rings. In the instance shown the rings are divided in halves, though they may be further sectioned, if desired. Each of the rings 8 has a bevelled face 10 which engages a like bevelled face 11 of the adjacent abutment ring 7. The peripheries of the abutment rings 7 tightly fit the bore of the member 4, thus to prevent leakage between the rings and said member. The rings 8 have their bevelled faces 10 turned away from the chamber 12 in which the fluid pressure is developed.

In this particular instance the chamber 12 constitutes a cylinder, of which the head is indicated at 19. The plunger working within the cylinder 12 is fragmentarily indicated at 13 in Fig. 1 and said plunger is operated by the plunger rod 5 which passes through the rings 7, 8. Thus, in this instance, the rod 5 is the member that is packed. A gland 14 closes the outer end of the chamber 4, being held in place by stud bolts 15 of which only one is indicated in Fig. 1 because of the nature of the view.

The recesses 6 in which the rings 8 are mounted are materially longer than the thickness of said rings so that said rings are free to reciprocate in the member 4.

It will be noted, in Fig. 1, that the rings 8 are of slightly less diameter than the bore of the member 4 so that, when contracted, said rings will be free from the wall of said bore. Also the bores 17 of the abutment rings 7 are of slightly greater diameter than the rod 5 so as to be free from said rod at all times.

In describing the operation of the invention, it may be assumed, for example, that the construction illustrated in Fig. 1 is that of a pump and that the rod 5 is moving on its out stroke as indicated by the arrow thereon. Since the plunger 13 is moving toward the head 19, the fluid in front of the plunger is under higher pressure than atmospheric and tends to escape past the rod 5 into the bore of the member 4. This fluid pressure is active against the rear face of the first packing ring 8, forcing said ring against the adjacent bevelled face 11, thus contracting said ring 8 upon the rod 5 and strongly tending to prevent the escape of the fluid between said ring and said rod. If any fluid does pass this first ring 8, the fluid pressure acts in the same manner upon the second ring 8 so as to likewise contract it upon the rod 5. It will be understood that one or more rings 8 will be employed, according to the amount of pressure being dealt with. The amount of pressure will also be a factor to be considered in determining the degree of bevel of the faces 10, 11, as will be readily understood. The greater the bevel the greater the inward thrust of the ring sections upon the rod 5 under a given fluid pressure.

It will be desirable to provide the abutment rings 7 with threaded holes 18 for receiving a suitable tool, not shown, whereby the rings 7 may be pulled out of the bore of the member 4.

While I have shown and described a packing construction applicable to pumps, it will be readily understood, without further illustration, that the same principle may be employed with other constructions to obtain a like result in mechanism other than pumps.

I claim:

A packing construction comprising a cylinder, a stuffing box at one end of the cylinder, a plunger in the cylinder, a rod for the plunger projecting through the stuffing box, a sectional ring in the base of the stuffing box surrounding the rod and having a beveled face turned away from the cylinder, and an abutment ring fitting tightly in the bore and having a beveled face for the first beveled face to engage, said abutment ring being spaced a greater distance from the inner end wall of the stuffing box than the thickness of the sectional ring to permit reciprocation of the sectional ring, and the outside diameter of the sectional ring being less than the diameter of the bore of the stuffing box when the sectional ring is contracted upon the rod.

Signed at Taft, Kern County, California this 5th day of March, 1924.

DON A. LEIGH.